United States Patent [19]

Major et al.

[11] 4,344,008
[45] Aug. 10, 1982

[54] BRUSH SPRING TENSION ADJUSTMENT FOR DYNAMOELECTRIC MACHINE

[75] Inventors: Jeffrey T. Major, Cygnet; Nelson S. Gibson, III; Jerry L. Young, both of Toledo, all of Ohio

[73] Assignee: Eltra Corporation, Toledo, Ohio

[21] Appl. No.: 145,112

[22] Filed: Apr. 30, 1980

[51] Int. Cl.³ .............................................. H02K 13/00
[52] U.S. Cl. ...................................... 310/242; 310/244
[58] Field of Search ............................... 310/238–242, 310/247, 220–222, 42, 229, 230, 248, 249

[56] References Cited

U.S. PATENT DOCUMENTS

| | | | |
|---|---|---|---|
| 643,000 | 2/1900 | O'Shaughnessy | 310/244 |
| 1,157,963 | 10/1915 | Shaw | 310/241 |
| 1,253,157 | 1/1918 | Creveling | 310/230 |
| 1,584,665 | 5/1926 | Shay | 310/244 |
| 3,242,362 | 3/1966 | Ciliax | 310/239 |

FOREIGN PATENT DOCUMENTS

| | | | |
|---|---|---|---|
| 519019 | 2/1931 | Fed. Rep. of Germany | 310/241 |
| 895026 | 10/1953 | Fed. Rep. of Germany | 310/241 |
| 1073607 | 1/1960 | Fed. Rep. of Germany | 310/241 |
| 1277865 | 1/1961 | France | 310/241 |

*Primary Examiner*—R. Skudy
*Attorney, Agent, or Firm*—James P. DeClercq

[57] ABSTRACT

A dynamoelectric machine (1), having brushes which contact an armature contact surface such as commutator (6) or slip rings, is provided with a plurality of independent, individually removable brush holders (10, 100). Each brush holder is provided with either a removable pin (102) to allow brushes to contact the armature contact surface after the brush holder (10, 100) has been installed, or with a clamping bolt (40), retaining brushes (8) in a predetermined position for insertion of the brush holder, and removal of the brush holder, the brush holder being tilted or cocked to avoid contact between it and the armature contact surface. Bolting the brush holder (10, 100) into place makes electrical contact between the dynamoelectric machine and the brush holder by means of an insulated, conductive threaded aperture (34) on the exterior service of the machine, a mounting bolt (24) inserted into this aperture (34) urging a conductive portion (20) of the brush holder into electrical contact. The brush holder (10, 100) may be further provided with a rotatable spring support (212) for varying the pressure exerted on the brushes, and a measuring scale (216) for correlating the length of partially worn brush with an angular position of the spring support, to facilitate adjustment of brush pressure as brushes wear. Angular adjustment of the position of the spring support may also serve to lift certain types of brushes into a retracted position. The disclosed brush pressure adjustment structure is also usable with non-removable brush holders.

10 Claims, 13 Drawing Figures

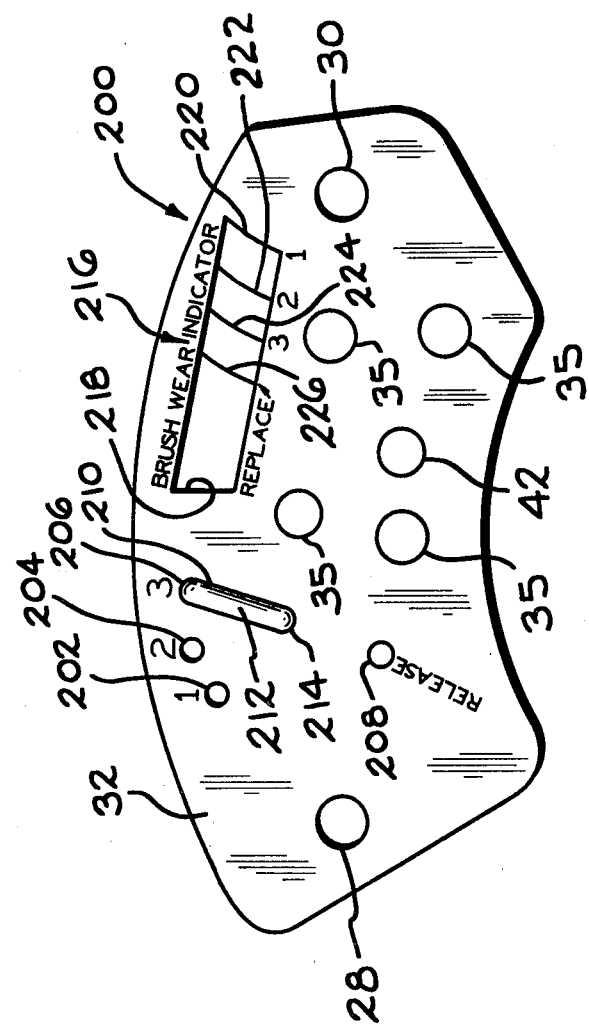

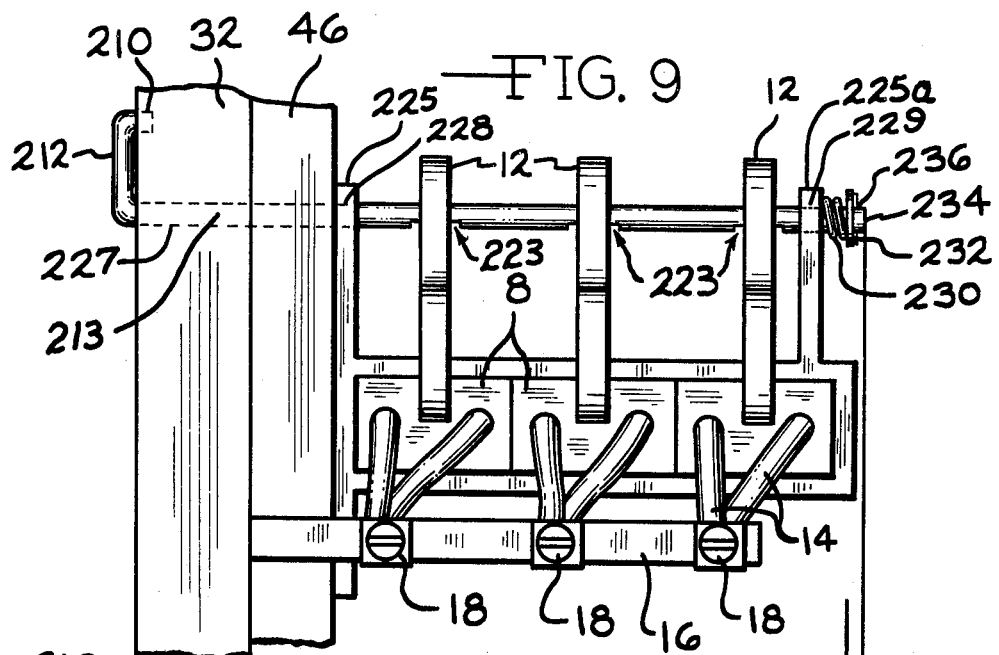
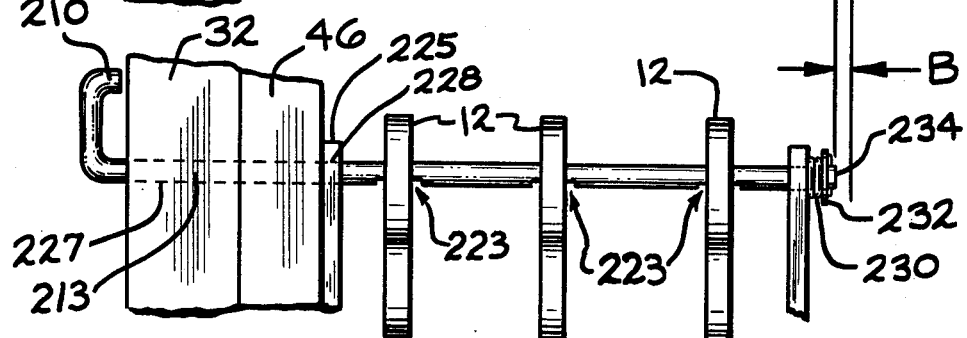
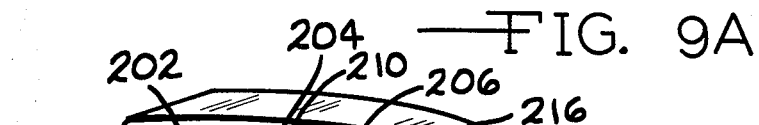

BRUSH SPRING TENSION ADJUSTMENT FOR DYNAMOELECTRIC MACHINE

FIELD OF THE INVENTION

The instant invention relates to the field of removable brush support structure for electrical motors and generators. More particularly, this invention relates to adjusting brush pressure in removable brush-holders.

BACKGROUND OF THE INVENTION

Replacement of electrical contact brushes in electric machines such as motors and generators is usually a difficult and time consuming task. Conventionally, brush holding structures are provided either in the interior of the motor or on the inside of the motor housing. In either event, the motor must be partially disassembled to replace brushes. This is a time consuming and difficult task, particularly when the motor must be removed from the assembly before it can be disassembled to replace brushes. Such disassembly is necessary in many applications, and in particular where the motor is installed on an electrically driven vehicle. In addition, holding the brushes and brush box clear of the armature contact surface while a armature is being installed in the motor, or while the brushes are being installed in the motor, is important, to avoid scratching the armature contact surface. Such a surface is known as a commutator in the case of a D.C. machine, and as a slip ring in A.C. machines. Any damage to the commutator or slip ring tends to magnify itself, causing accelerated wear of both the brushes and the armature contact surface. There are two basic, nonexclusive, mechanisms by which a scratch in a commutator bar or slip ring may accelerate wear to both brushes and the armature contact surface. First, as the commutator revolves, the scratch will roughen the surface of the brush. On a microscopic scale, this increases the amount of arcing between the brush and the commutator bar segments or slip ring. This increased arcing causes a rougher than normal commutator, resulting in faster brush wear, further roughening of the surface of the brush, and a further increase in arcing, which further damages the commutator or slip ring. Secondly, a scratched commutator or slip ring can result in an out-of-round commutator or slip ring, which also causes increased arcing and further damage to brushes and commutator or slip ring. Again on a microscopic scale, when a brush and a scratch interact, the brush is either cocked in its holder, or bounced a short distance radially to the commutator or slip ring. If it is cocked in the brush holder, it will rock or oscillate for a short period of time. As it rocks or oscillates, increased arcing occurs between the edge of the brush further from the commutator or slip ring, wearing both brush and commutator or slip ring. In addition, the resultant rounding of the brush, on a microscopic scale, reduces contact area between the brush and the commutator or slip ring, further accentuating wear to both the commutator or slip ring and the brush. If the brush is deflected vertically, the commutator or slip ring will turn beneath it before it returns (and bounces several times). During this time, arcing will increase, resulting in a small flat spot on the commutator or slip ring. This flat spot will be accentuated during subsequent revolutions of the electric machine, since, even ignoring the effect of the scratch, the commutator or slip ring effectively falls away from the brush when it reaches the flat spot, causing further accentuated arcing, and further wear. And, of course, the brush bounces when recontacting the commutator or slip ring, causing further small flat spots. This semirandom shape causes much increased brush wear, since the brush crumbles slightly each time the brush spring returns it violently to the surface. Therefore, it is important to avoid scratching the commutator or slip ring while installing and removing brushes. Scratching of a commutator or slip ring is much less likely to occur when the brushes may be removed radially to the commutator or slip ring, as in large, stationary motors and generators, operating in an extremely clean environment. However, when a motor must be protected due to its operating environment, or when surrounding structure blocks radial access to the motor, axial movement of either brushes or commutator or slip ring must occur when brushes are being renewed, whether by use of applicants invention, or by conventional disassembly of the motor. One structure for a brush holder which may be removed axially is disclosed in U.S. Pat. No. 3,450,915, issued July 17, 1969, to Zumsteg, entitled *BRUSH ARRANGEMENT FOR DIRECT CURRENT DYNAMO-ELECTRIC MACHINE*. There, brush holders are secured to a ring which is removably attached to the motor end plate. The end plate of the machine is provided with openings through which the brush holders and brushes protrude. As the ring is removed, a spring loaded pin acts to apply an end pressure against the brushes in a brush holder to keep the brushes from falling out of the brush holder. Conversely, this spring loaded pin will hold the brushes in the brush holder, out of contact with the commutator, as new brushes are being inserted from the end of the motor, until the brushes are almost in place, at which time the spring loaded pin releases pressure against the brushes, releasing the brushes. Therefore, for the last increment of movement, the brushes will slide axially along a commutator segment or segments, and depending on brush material, may do microscopic scratch-type damage to the commutator, with the possible results described above, or may damage a brush by scraping it across the sharp commutator edge. In this regard, it should be noted that new brushes have sharper edges than used brushes, and are more likely to cause damage to the commutator. Also, the most importantly, with the structure disclosed by Zumsteg, it is impossible to cock or tilt the brush holder to insure that the hard metal brush holder or brush box itself does not touch the commutator, in addition to the fact that the disclosed structure is inoperative when supporting and surrounding structure crosses the axis of the motor, such as when a motor is used on an industrial forklift truck. In such an application, the task of removing and replacing the motor to renew or inspect the brushes consumes about four hours, in contrast to the brush renewal time of about 30 minutes using applicant's invention.

In addition, brushes may be themselves damaged during insertion and removal. Allowing brushes to contact the commutator or slip ring before fully in place drags the last brush over the sharp corner of the commutator or slip ring, possibly breaking the brush. Upon removal, if not restrained, a brush will snap downward as it clears the commutator or slip ring and may smash against other structure, or may simply protrude too far, and be easily accidentally broken. The instant invention overcomes such disadvantages of known structures for brush holders.

Also, it is desirable to maintain the surface of a brush which slides upon an armature contact surface in compression, to insure firm contact. The amount of pressure on a brush may determine its rate of wear and useful life. While frictional forces increase as pressure upon a brush increases, this does not imply that low brush pressure corresponds to long brush life. To the contrary, low brush pressure results in chattering and increased arcing, and rapid brush wear, by some of the mechanisms described above. Therefore, pressure upon brushes should be maintained at or near a value experimentally determined to result in a minimum brush wear rate. One prior attempt to do this utilized cumbersome movable pivoted brush holders in the shape of a lever arm and torsion springs with free ends insertable in notches in the lever arm body. This approach may be usable with large dynamoelectric machines, where the brush holder assembly is freely and easily accessible, and where there are no space or size limitations.

Where space permits, a linear spring which coils up when released may be used to provide brush pressure. A free end of this spring is anchored to the brush box near the armature contact surface, pulling the brush towards the armature as the brush wears and the spring coils up and presses its furthermost surface. This is a bulky arrangement, best suited for large stationary generators and motors, so that extremely long brushes can be used, for long brush life.

Conventionally, particularly in mobile application, where space and weight restrictions apply, a spiral-wound spring, with a free end in the form of a cantilevered lever arm, provides a somewhat constant force upon a brush, but makes no provision for adjusting pressure upon a brush in accordance with experimentally determined requirements, or even for compensating for the decrease in pressure as the spiral spring unwinds.

The instant invention overcomes these and other deficiencies of the prior art.

SUMMARY OF THE INVENTION

It is a primary object of the invention to produce an axially-removable brush holder, removable from the exterior of a dynamoelectric machine, and having means for retaining the brushes in the brush holder when brushes are being installed or removed, to prevent scratching of the commutator or slip ring.

It is a further object of the invention to produce an axially-removable brush holder which is independent from any other brush holders in a motor, so that it can be tilted or cocked to avoid any possibility of the brush or brush holder contacting the commutator or slip ring during insertion or removable.

It is a further object of the invention to produce a brush holder structure such that tightening the bolts holding the brush holder to an end frame of a motor also establishes the electrical connection to the brush holder.

It is a further object of the invention to produce a brush holder structure wherein pressure on the brushes may be conveniently adjusted.

It is a further object of the invention to produce a brush holder structure where pressure on the brushes may be adjusted by rotating a rod member to which spiral springs are mounted, useable with fixed or removable brush holders, and useable where external or internal adjustment provisions are desired.

BRIEF DESCRIPTION OF THE DRAWINGS

FIG. 3a shows the embodiment of the brush holder shown in FIG. 3, with the means for retaining the brushes in the brush holder shown in inoperative position.

FIG. 7 is a front elevational view of a second alternate and preferred embodiment of a removeable brush holder according to the invention.

FIG. 8 is detailed perspective view of the brush holder shown in FIG. 7.

FIG. 9 is a partial top elevational view of the brush holder shown in FIG. 7.

FIG. 9a is a partial top elevational of the brush holder shown in FIG. 7, showing the operation of a brush pressure adjustment mechanism.

DESCRIPTION OF THE PREFERRED EMBODIMENTS

Figure 1:
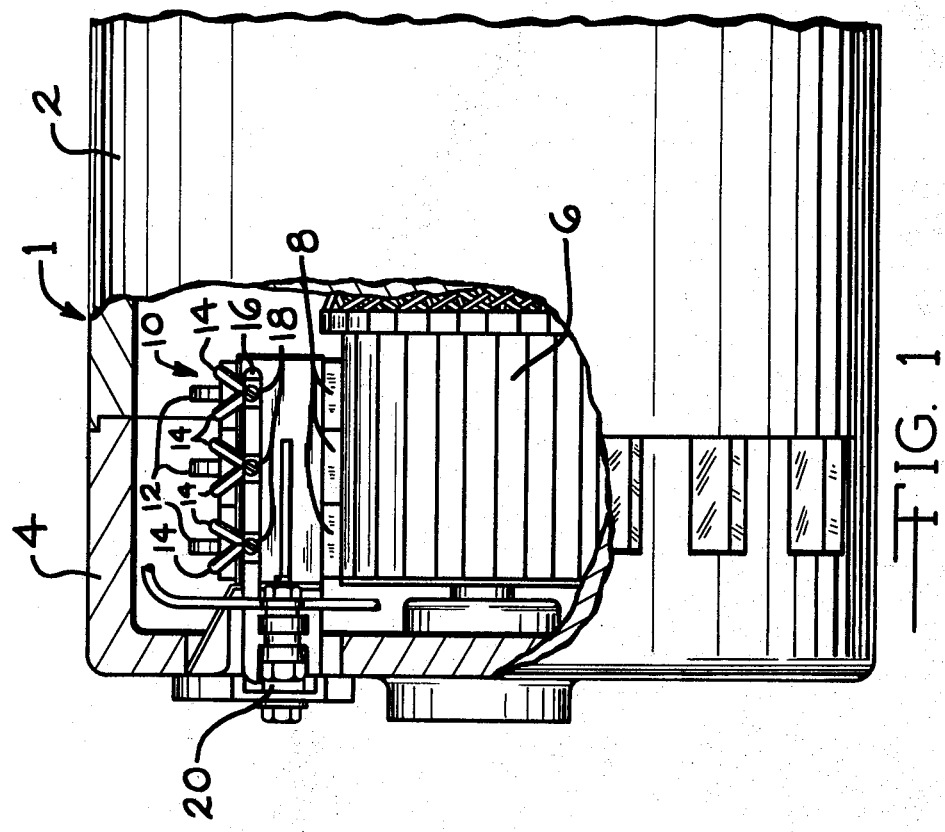
FIG. 1 is a partial side elevational view, partially in section, showing a motor having a removable brush holder according to the preferred embodiment of the invention.
Figure 2:
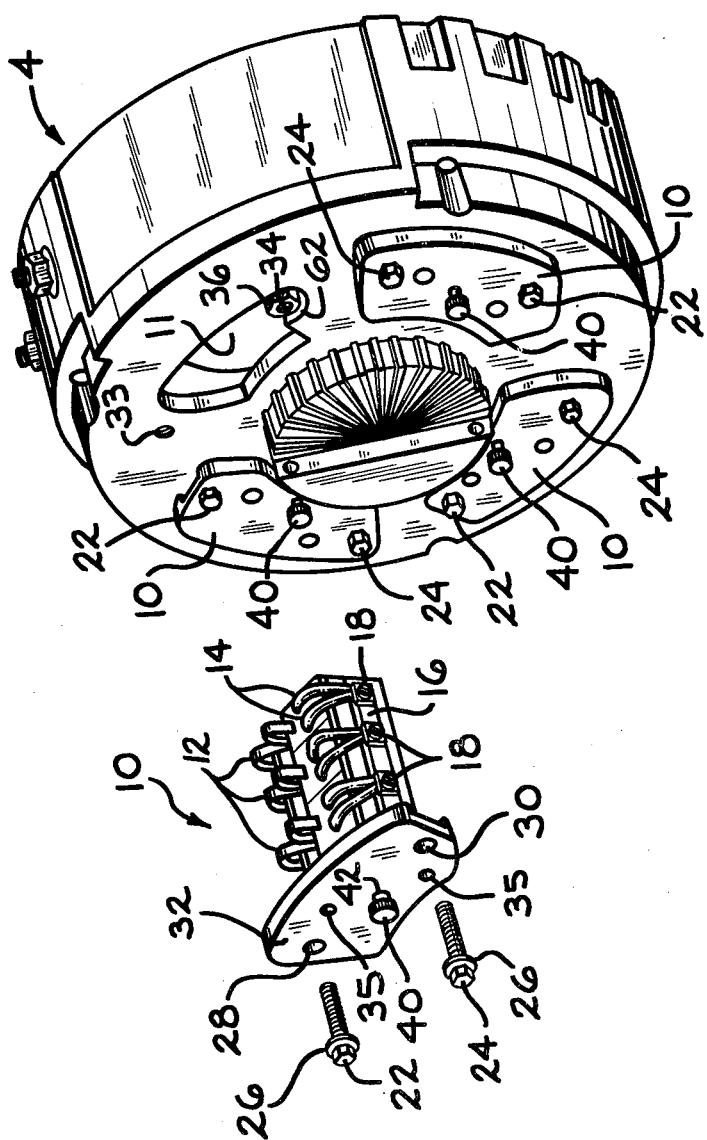
FIG. 2 is an exploded view, in perspective, showing an end frame of a motor and a removable brush holder according to the preferred embodiment of the invention.

FIGS. 1 and 2 show a motor 1 having a main frame 2 and an end frame 4. Motor 1 has a conventional armature contact area such as commutator structure 6, shown contacting brushes 8 in a removable brush holder 10, which fits through aperture 11 in end frame 4. Obviously, only the axial position of brushes 8 need be varied from that shown to make the invention usable with the slip rings of an A.C. dynamoelectric machine as well as the commutator of a D.C. machine.

Figure 6:
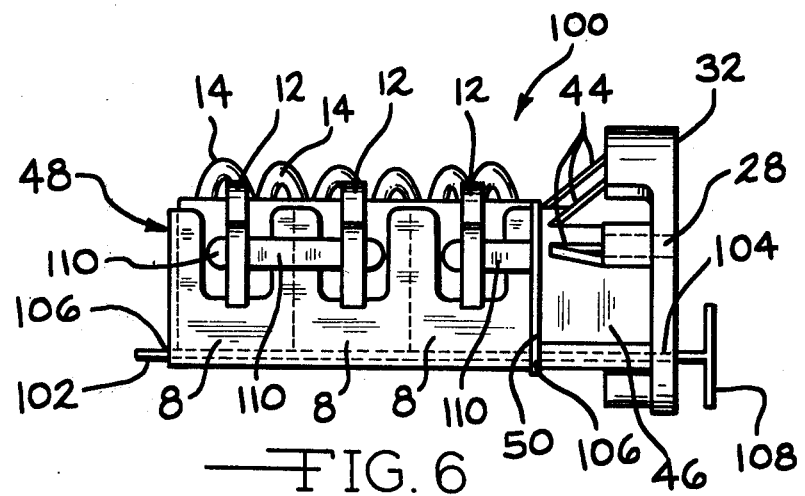
FIG. 6 is a side-elevational view of the brush holder of FIG. 5.

The brushes 8 are held in contact with commutator 6 by spiral springs 12, retained in conventional manner on T-shaped supports, best shown in FIG. 6. Brush lead wires 14 are connected to bus bar 16 by screws 18. Bus bar 16 includes tab 20, which serves as the electrical connection point for brush holder 10. Tab 20 is most clearly illustrated in FIGS. 1 and 4.

Bolts, or attachment, or fastening means 22 and 24, with spring washers 26, pass through apertures 28 and 30 in face 32 of brush holder 10. A hole, not shown, in tab 20 is aligned with aperture 30. As most clearly shown in FIG. 4, bolt 24 is passed through aperture 30, and screwed into threaded bore 34 of bolt 36, pressing tab 20 against head 38 of bolt 36 to establish electrical contact as will be described below.

Bolt 22, having spring washer 26, is passed through aperture 28 in face 32 of brush holder 10, and secened into threaded aperture 33 in end frame 4. This bolt serves only to retain brush holder 10 in place, and serves no conductive purposes in the preferred embodiment of the invention. Also shown in FIG. 2 are recesses 35, intended to protect fastening means such as rivets from accidental contact.

Each brush holder 10 includes a clamping means such as screw 40 having threaded portion 41, which may be passed through a threaded aperture 42, to press against brushes 8 in brush holder 10, locking brushes 8 in their current position, whether selected manually or due to contact with an armature contact surface such as commutator 6. If desired, a separate threaded aperture could be provided through face 32 of brush holder 10 for the purpose of storing screw 40 in a position where it could not be inadvertently left in aperture 42 and bearing against brushes 8 after installation of brush holder 10 was completed.

Figure 3:
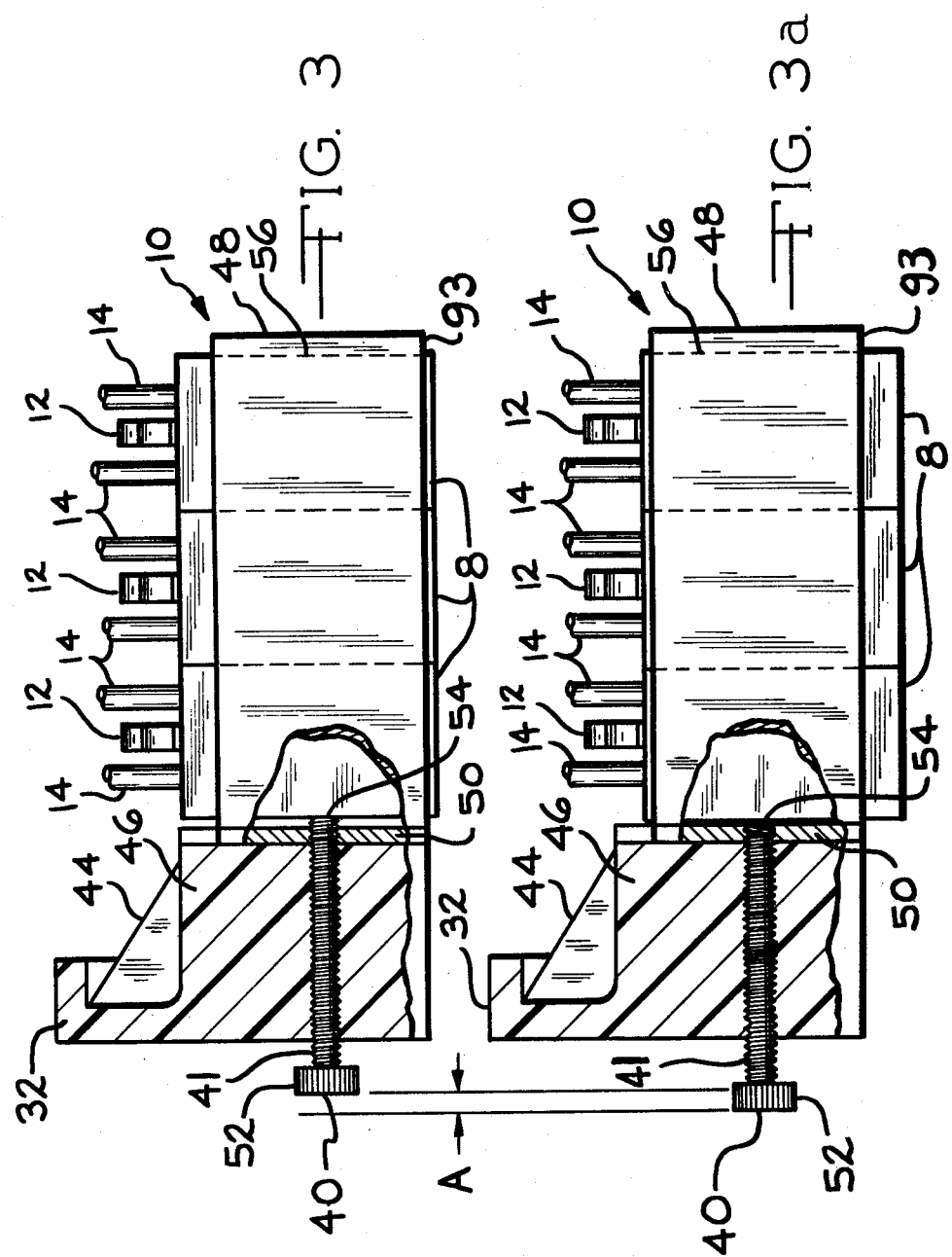
FIG. 3 is a side elevational view of a brush holder according to the preferred embodiment of the invention, showing the means for retaining the brushes in the brush holder for insertion and removal of the brush holder in operative position.

As most clearly illustrated in FIG. 3, brush holder 10 includes a mounting or face portion 32, at least one reinforcing rib 44, a body portion 46, and a conductive brush box 48. Member 50 is a flange integral with brush box 48, cooperating with rivets or like fasteners disposed through face 32, which fasteners may be nonconductive, recessed, or insulated in conventional manner. In the preferred embodiment, fasteners are recessed in recesses 35 to avoid accidental contact, and the recesses may be filled with an insulating material.

Portions 32, 42 and 46, in the preferred embodiment, are integrally formed from an insulating plastic, avoiding the use of insulating washers and tubes and the like for attaching brush box 48, and avoiding complex structure for isolating brush holder 10 from frame 4, and insulating or covering brush holders 10, which would be contrary to some of the advantages of the invention. One suitable material is glass and mineral fiber filled polyphenylene sulfide, available from Phillips Chemical Company under the registered trademark RYTON, type R-8 having been found to be satisfactory. Obviously, other materials could be used. Screw 40, in the preferred embodiment, has a knurled or ribbed head 52, to facilitate manual rotation. From the inactive position shown in FIG. 3a, with tip 54 not in contact with a brush 8, screw 40 is rotated inwardly at a distance of approximately ⅛ inches (approximately 3 millimeters) to active position as shown in FIG. 3, with tip 54 of threaded portion 41 bearing against brushes 8, pushing them against each other and against end 56 of brush box 48, frictionally retaining them in place.

Figure 4:
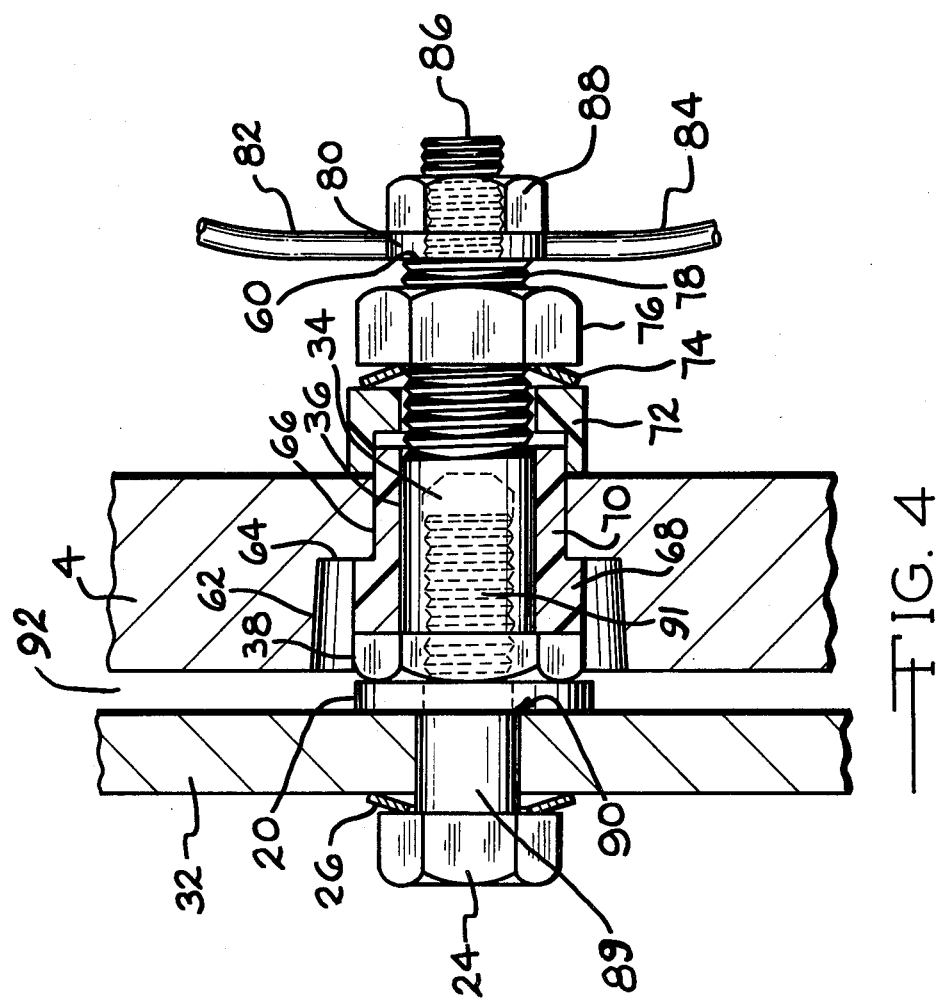
FIG. 4 is a schematic side elevational view, partially in section, of the structure for electrically connecting or disconnecting the brush holder by installing or removing a bolt retaining the brush holder to the end frame of the motor.

FIG. 4 is a detailed view of the structure whereby one of the bolts retaining brush holder 10 in aperture 11 of motor end frame 4 also serves as a unitary means to establish and break electric contact. As shown in FIG. 4, a special bolt 36 has a head 38, a threaded bore 34, and a shoulder 60. Motor end frame 4 has a recess 62, which has a shoulder 64 and bore 66. An insulator 68 is retained between head 38 of bolt 36 and shoulder 64, and has a portion 70 extending through bore 66. Insulator 72 is retained between spring washer 74 and nut 76 and the interior surface of motor end frame 4. Nut 76 is mounted on threaded portion 78 of bolt 36. To make electrical contact, a tab 80, having wires 82 and 84 attached in conventional manner, and having a hole therethrough, (not shown), is placed on threaded portion 86 of bolt 36. Tab 80 is retained between shoulder 60 and nut 88 on threaded portion 86, and makes electrical contact between bolt 36 and wires 82 and 84, for connection to other components of motor 1. Bolt 24 includes an unthreaded portion 89, and a threaded portion 91, with a shoulder 90 separating portions 89 and 91. When threaded portion 89 is threaded into bore 34 of bolt 36, tab 20 is pressed between shoulder 90 and head 38. Portion 89 is of an appropriate length to avoid placing undue pressure on face 32 of brush holder 10 when installing bolt 24 with sufficient tightness to make good electrical contact between tab 20 and bolt 36.

Figure 5:
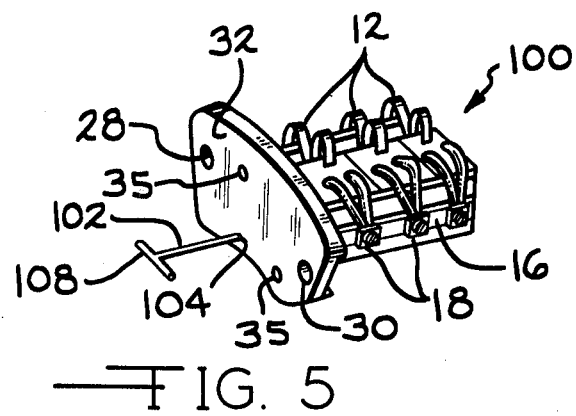
FIG. 5 is a perspective view of an alternate structure for brush holder according to the invention.

FIGS. 5 and 6 illustrates an alternative, non-preferred structure for a brush holder according to the invention, which is functional where brushes are not inspected, and are not removed for replacement until the motor ceases to operate. A brush holder generally indicated as 100, includes the same structural elements as brush holder 10, with the exception of clamping means screw 40, and with the addition of a rod member such as plastic rod member or pin 102. Pin 102 is passed through aperture 104 in face portion 32 and body portion 46 and apertures 106 in brush box 48, after brushes 8 have been manually positioned to allow pin 102 to be inserted through apertures 104 and 106. Pin 102 is provided with T-handle 108, to facilitate its removal. Brush holder 100 is inserted through an aperture 11 in the same manner as brush holder 10, to be described below, and fastened in place by means of bolts 22 and 24. Then, pin 102 is withdrawn, allowing the brushes 8 to make contact with an armature contact surface such as commutator 6. Aside from the face that brush holder 100 does not accomplish the task of holding the brushes in position when the brush holder 100 is being removed, there is a possible disadvantage with the use of a pin such as 102 to maintain brushes in position for brush holder insertion. When pin 102 is withdrawn from apertures 104 and 106, brushes 8 are propelled against the surface of the armature contact surface such as commutator 6 by spiral springs such as spiral springs 12. This may result in breakage of brushes 8.

Also shown are T-shaped spring supports 110, having a conventional D-shaped crossmember (not shown) for retaining D-shaped innermost coils (not shown) of spiral springs 12.

The internal wiring of a dynamoelectric machine such as motor 1 is conventional, and forms no part of the instant invention. In the embodiment illustrated, there are four separate brush holders 10 or 100 which are wired in pairs internally by means of wires 82 and 84, and other wires, not shown, and are connected to conventional field windings or external terminals in motor 1 in conventional manner.

To install brushes using a removable brush holder 10 according to the preferred embodiment of the invention, the brushes 8 are first positioned as shown in FIG. 3 manually, with brushes 8 projecting slightly beyond surface 93 of brush box 48, so that any inadvertent contact with an armature contact surface such as commutator 6 will be with comparatively soft brushes 8 rather than with brush box 48. Screw 40 is then tightened to retain brushes 8 in this position. Brush holder 10 may be cocked or tilted to increase the distance between brushes 8 or brush box 48, and the armature contact surface such as commutator 6, to further avoid such inadvertent contact as brush holder 10 is inserted through aperture 11. Bolts 22 and 24, with spring washers 26, are then inserted through apertures 28 and 30 in brush holder 10 and into threaded aperture 33 and threaded bore 34, and tightened in conventional manner. Tightening bolt 24 causes tab 20 of bus bar 16 to be compressed between shoulder 90 and head 38 of bolt 36, making electrical contact with bolt 36, which in turn is connected to wires 82 and 84. Screw 40 is then rotated to withdraw it a distance A, as shown in FIG. 3 and 3a, to gradually release the brushes 8 and allow then to contact an armature contact surface such as commutator 6. Screw 40 may then be stored in a separate threaded hole which does not extend through flange 50, if desired. The provision of such a hole may be desirable in some applications, particularly where the motor is accessible to unauthorized persons. Alternatively, screw 40 may simply be removed and stored separately, such as with a supply of replacement brushes 8. To remove brush holder 10 for inspection or renewal, the sequence of events is reversed. Screw 40 is brought to bear against brushes 8, retaining them in position. Screws 22 and 24 are removed, the removal of screw 24 and movement of brush holder 10 breaking electrical contact. Brush holder 10 is cocked or tilted to move brushes 8 away from an armature contact surface such as commutator 6, and brush holder 10 is removed. In the preferred embodiment, a gap 92 is left between face 32 and end frame 4, to allow some air flow to the interior of motor 1. As is known in the art, a gasket could be provided to seal this opening, although a differing and more expensive composition of brushes 8 may be desirable to provide satisfactory brush life in the absence of the lubrication provided by atmospheric moisture.

FIGS. 7, 8, 9 and 9a illustrate a removable brush holder which also includes means for adjusting tension of springs which hold brushes against the armature contact surface, indicia for measuring the remaining length of brushes after they have been removed from the brush holder for inspection, and correlating the length remaining with a tension setting for the springs. Since the embodiment shown in FIGS. 7, 8, 9 and 9a is an improvement on brush holder 10, as shown in FIGS. 1, 2, 3, and 3a similar numbers for corresponding elements will be used wherever possible. As shown in FIG. 7, face portion 32 includes apertures 28 and 30 for mounting a brush holder 200 to an end frame 4, a threaded aperture 42 adapted to receive a screw 40 or the like for clamping brushes in place, four recesses 35 for rivets, not shown, holding face portion 32 to brush box 48. Also shown are apertures or holes known as recesses 202, 204, 206, and 208, adapted to received a bent end 210 of the arm a lever 212, having a shaft or a shaft portion 213 rotatably extending through an aperture 214 in face portion 32, and an indicia 216 which is preferably embossed on, or engraved in, the surface of face portion 32. Indicia 216 is in the general form of a side view of brush used with a brush holder 200, as it would appear at various stages in its useful life.

To make use of such an indicia, a user might visually compare a brush 8 with indicia 216, or may remove a brush 8 and place it against indicia 216, in alignment with indicia 216. Then, with the end surface of brush 8 which has wires 14 attached placed against line 218, the position of the end surface of brush 8 which contacts the armature surface determines the proper setting of lever 212, to match spring tension against brush length. With the brush 8 positioned as described, if line 220 alone is visible, lever 212 should be rotated to place end 210 in recess 202. If line 222 is visible, end 210 should be placed in recess 204. If line 224 is visible, end 210 should be placed in recess 206. If line 226 is visible, the brush should be discarded and replaced. Indicia 216 and apertures 202, 204, and 206, include indicia relating brush length to the positioning of lever 212. End 210 of lever 212 may also be placed in aperture 208. As will be further described below, placing lever 212 in this position may either completely remove spring pressure from the brushes 8, or may be usable to lift brushes 8 to a retacted position for insertion and removal of brush holder 200 in aperture 11 of end frame 4. A screw 40 may be placed in threaded aperture 42 to maintain brushes 8 in raised position, or in a manually selected position.

FIG. 8 is a sectional perspective partial view of the embodiment shown in FIG. 7, showing end 210 and lever 212 in greater detail, and showing a screw 40 with knurled head 52 disposed in aperture 42, and showing a portion of indicia 216 as engraved into face portion 32 of brush holder 200.

FIGS. 9 and 9a illustrate the manner in which angular positioning of lever 212 affects brush spring tension. Comparing FIG. 9 with FIG. 6, it will be seen that spiral springs 12 are retained on flattened, D-shaped sections 223 of shaft portion 213 of lever 212, which is supported on arms 225 and 225a which protrude from brush box 48, rather than being supported on D-shaped crossmembers (not shown) of T-shaped spring supports 110. By rotating lever 212, and D-shaped sections 223, the angular position of springs 12 is varied, thereby varying the force they exert against brushes 8. In the preferred embodiment, sections 223 are occluded by springs 12, thus preventing springs 12 from moving along portion 213, although any desired parts of lever 212 may be made D-shaped. Lever 212 is positioned in an aperture 227 through face portion 32 and body portion 46, an aperture 228 through arm 225 and an aperture 229 through arm 225a. Lever 212 is retained in position by means of a spring 230 disposed adjacent an end 234 of lever 212, and retained in position by pin 236 through an aperture, not shown, in lever 212 adjacent end 234. As is apparent, the structure described is easy to assemble, lever 212 being placed through apertures 227, 228 and 229 spring 230 and washer 232 being applied over its end 234, and a cotter pin or other type of pin 236 inserted through an aperture adjacent end 234. It will be apparent that springs 230 may be positioned at another portion of lever 212, and that other means of retaining the end of a lever 212 are possible. For instance, should springs 212 be prevented from moving along portion 213 of lever 212, and prevented from sliding upon brushes 8, sideways distortion of spiral springs 12, perpendicular to the direction of winding of springs 12, will provide a restoring force to lever 212.

As illustrated in FIGS. 9 and 9a, to change the angular position of D-shaped sections 223 of lever 212, lever 212 is grasped adjacent end 210, and manually moved outwardly from face 32 a distance B, removing end 210 from a recess 202, 204, 206, or 208, and allowing lever 212 to be rotated. Note that when directions are mentioned, they are for propose of explanation of the drawings, and not intended as limitations. As can be seen FIGS. 9 and 9a, spring 230 is compressed by this manual movement, and acts to urge end 210 against face portion 32, and into an aperture 202, 204, 206, or 208.

It will be apparent that the brush pressure adjustment structure disclosed herein is also usable with fixed, non-removable brush holders, and is desirable for such brush holders in applications where in a dynamoelectric machine is regularly disassembled for inspection, so that brush spring tension may be adjusted at that time based on the remaining brush length, to increase brush life. In short, a lever such as lever 212 having a flattened, D-shaped sections such as 223, a return spring such as spring 230, and detent recesses such as recesses 202, 204, and 206, can be provided in structure for a fixed brush holder. The structure illustrated in FIGS. 9 and 9a may also be modified to place end 210 of lever 212 inside the motor, as well as having lever 212 protruding through the end frame of the motor. An embodiment of an adjusting mechanism according to the invention for a non-removable brush holder may be visualized by interpreting FIGS. 9 and 9a, interpreting body portion 46 as a conventional brush mounting ring, and interpreting face portion 32 as the end frame of a conventional dynamoelectric machine, or by a simple rearrangement of FIGS. 9 and 9a to place end 210 inside the motor, such as by placing spring 230, washer 232 and pin 236 on the opposite side of arm 225a, and providing detent apertures for end 210 in the end surface of brush box 48. As described above, only the position shown for brushes 8 need be varied to use the invention with slip rings, in place of a commutator, as shown.

Figure 10:
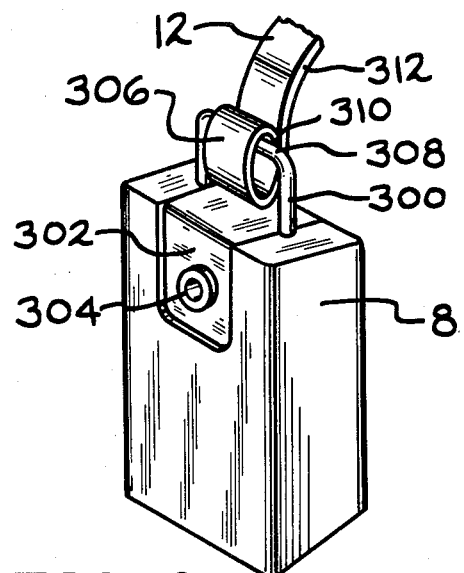
FIGS. 10 and 11 show brushes and pressure springs adapted for use with the brush holder shown in FIG. 7.

There are several types of brushes, which are available for use on larger dynamoelectric machines, to protect the material of brushes from high spring forces and to facilitate the removal of badly worn brushes from deep brush holders, and to satisfy other needs. These and other types of brushes are described in American National Standard Brushes for Electrical Machines, ANSI/NEMA Standards Publication No. CB1-1977, a joint standard of the American National Standards Institute, Inc., and the National Electrical Manufactures Association, copies available from the American National Standards Institute, Inc., 1430 Broadway, New York, N.Y. 10018, and from the National Electric Manufacturers Association, 2101 L. Street NW., Washington, D.C. 20037. Of the various configurations shown having lifting and guide clips therein, Type-D, having a bail-type lifting clip fixed to the brush by a metal plate, and Type-E having a lifting clip formed into the shaped of a hook, may be advantageously used with an embodiment of the invention. As shown in FIG. 10, a brush 8 may be provided with a bail-type device 300, retained to brush 8 by a strap 302 held to brush 8 by rivet 304. Conventional springs 12 have a folded-back portion at an end thereof which contacts a brush such as brush 8, to avoid damaging the brush. A brush 8 may also have a protective plate similar to strap 302 to further protect it from damage by the end of a spring. Such a brush with a bail-type handle may be used in conjunction with a preferred embodiment of the invention, to allow the brush to be lifted into a retracted position by moving end 210 of lever 212 into recess 208. To accomplish this, an end 306 of a spring such as spiral spring 12 may be fabricated to have aperture 308 between folded-back tip 310 of spring 12 and portion 312 of spring 12, so that the bail 300 may be snapped into aperture 308. Such a brush and spring assembly is preferrably designed so that spiral spring 12 presses upon strap 302 to urge brushes such as brush 8 against an armature contact surface, and pulls upon bail 300 to raise the brush for installation and removal of a removable brush holder according to the invention.

Figure 11:
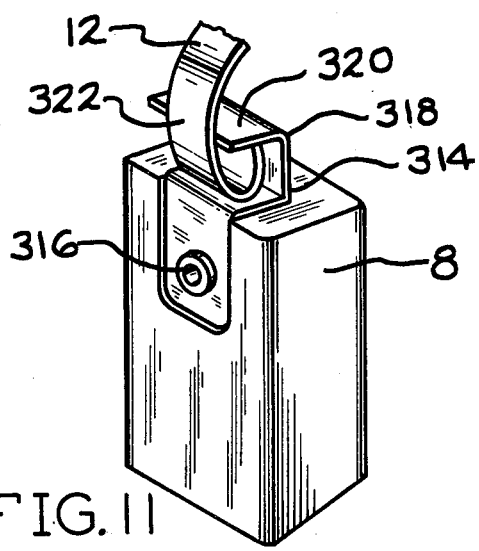

FIG. 11 shows a brush 8 with a Type-E clip formed in the shaped of a hook. Clip 314 is retained to brush 8 by rivets 316, and has a upright portion 318 and a folded-back portion 320. FIG. 11 also shows the tip shape of a spiral spring 12 adapted to use such a brush with an embodiment of the present invention. Spring 12 may be manufactured with a sharp reverse curve adjacent its tip, the folded-back tip portion forming a portion 322 adapted to be clipped under portion 320 of clip 314. Upward motion of portion 322 of spiral spring 12 caused by placing end 210 of lever 212 into recess 208 will cause brush 8 to be lifted into a retracted position.

As will be apparent, numerous variations, combinations of features, and modifications may be made to the described embodiments of the invention without departing from the spirit and scope of the invention.

We claim:

1. A removable brush holder for use in a dynamoelectric machine having an end frame and an armature contact surface and means for retaining said brush holder in operative position adjacent to said armature contact surface, comprising:
   means for making electrical contact to said brush holder;
   a bus bar for making electrical contact from said brush holder to brushes of said brush holder;
   a brush box for slidably retaining said brushes;
   adjustable spring means for urging said brushes against said armature contact surface;
   said adjustable spring means including wound spring mounted upon a shaft of a lever and adapted to press against said brushes;
   said shaft being rotatably mounted in said brush holder and having a portion cooperating with an intermost coil of said wound spring;
   said shaft being provided with means for retaining said shaft in one of at least two angularly spaced positions.

2. A brush holder according to claim 1, wherein said means for retaining said shaft includes a end of said lever and a plurality of apertures defined by a surface of said brush holder, said end being adapted to be received in one of said apertures, and spring means for urging said end towards said surface.

3. A brush holder according to claim 2, wherein:
   said section is a flattened D-shaped section;
   said spiral spring has a D-shaped innermost coil;
   said innermost coil engaging said shaft section.

4. An article of manufacture for varying the force exerted by a spring upon a brush of a dynamoelectric machine in a brush holder, comprising:
   a spiral spring having an innermost coil and an end adapted to bear against said brushes;
   a lever having an arm and a shaft section adapted to cooperate with said innermost coil of said spiral spring, said spiral spring being mounted on and engaging said section of said shaft;
   said lever being rotatably mounted to said brush holder; and
   means for retaining said shaft in a predetermined angular position.

5. An article of manufacture according to claim 4, wherein said means for retaining said shaft in a predetermined angular position comprises:
   said arm of said lever having a bent end;
   said machine including a plurality of spaced apart holes formed therein adjacent said shaft of said lever, said holes being adapted to cooperate with said bent end of said arm of said lever to retain said shaft of said lever in a predetermined angular position; and
   resilient means for resiliently urging said end into said hole;

whereby said force exerted upon said brush by said spring may be varied by positioning said end of said arm of said lever in one of said holes.

6. An article of manufacture according to claim 5, wherein:
said innermost coil is a D-shaped innermost coil, and said shaft section is D-shaped.

7. A removable brush holder for use in a dynamoelectric machine having an end frame and an armature contact surface and means for retaining said brush holder in operative position adjacent to said armature contact surface, comprising:
means for making electrical contact to said brush holder;
a bus bar for making electrical contact from said brush holder to brushes of said brush holder;
a brush box for slidably retaining said brushes;
adjustable spring means for urging said brushes against said armature contact surface;
said adjustable spring means including a wound spring mounted upon a shaft of a lever and adapted to press against said brushes;
said shaft being rotatably mounted in said brush holder and having a section cooperating with an innermost coil of said spiral spring;
said shaft being provided with means for retaining said shaft in one of at least two angularly-shaped positions;
said means for retaining said shaft including an end of said lever and a plurality of aperatures defined by a surface of said brush holder, said tip being adapted to be received in one of said apertures, and spring means for urging said tip towards said surface.

8. A brush holder according to claim 7, wherein:
said shaft has a flattened D-shaped section;
said spring has a D-shaped innermost coil;
said innermost coil engaging said shaft section.

9. An article of manufacture for varying the force exerted by a spring upon a brush of a dynamoelectric machine in a brush holder, comprising:
a wound spiral having an innermost coil and an end adapted to bear against said brushes;
a lever having an arm and a shaft section adapted to cooperate with said innermost coil of said spring, said spring being mounted on and engaging said section of said shaft;
said lever being rotatably mounted to said brush holder;
said arm of said lever having a bent end;
said machine including a plurality of spaced apart holes formed therein adjacent said shaft of said lever, said holes being adapted to cooperate with said bent end of said arm of said lever to retain said shaft of said lever in a predetermined angular position;
resilient means for resiliently urging said end into one said hole;
said lever being adapted to vary the force exerted upon said brushes by said springs, by said bent arm of said lever being placed in one of said holes.

10. An article of manufacture according to claim 9, wherein:
said spring has a D-shaped innermost coil; and
said shaft section is D-shaped, said innermost coil engaging said shaft section.

* * * * *